United States Patent
Fargano et al.

(10) Patent No.: US 9,225,747 B2
(45) Date of Patent: Dec. 29, 2015

(54) LAWFUL INTERCEPT UTILITY APPLICATION

(71) Applicant: CenturyLink Intellectual Property LLC, Denver, CO (US)

(72) Inventors: Michael J. Fargano, Louisville, CO (US); Christopher L. Mikkelson, St. Paul, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 14/198,885

(22) Filed: Mar. 6, 2014

(65) Prior Publication Data

US 2014/0325668 A1    Oct. 30, 2014

Related U.S. Application Data

(60) Provisional application No. 61/816,909, filed on Apr. 29, 2013, provisional application No. 61/857,750, filed on Jul. 24, 2013.

(51) Int. Cl.
*H04L 29/02* (2006.01)
*H04L 29/06* (2006.01)

(52) U.S. Cl.
CPC .............. *H04L 63/308* (2013.01); *H04L 63/30* (2013.01); *H04L 63/306* (2013.01)

(58) Field of Classification Search
CPC ...... H04L 63/30; H04L 63/306; H04L 63/308
See application file for complete search history.

(56) References Cited

U.S. PATENT DOCUMENTS 8,340,292 B1 * 12/2012 Schnellbacher et al. ...... 380/250

| | | | |
|---|---|---|---|
| 2002/0078384 A1 * | 6/2002 | Hippelainen | 713/201 |
| 2008/0049926 A1 * | 2/2008 | Imbimbo | 379/225 |
| 2009/0041011 A1 * | 2/2009 | Sheppard | 370/360 |
| 2009/0130984 A1 * | 5/2009 | Lee | 455/67.11 |
| 2011/0029667 A1 * | 2/2011 | Imbimbo et al. | 709/224 |
| 2012/0331126 A1 * | 12/2012 | Abdul-Razzak et al. | 709/224 |

OTHER PUBLICATIONS

Federal Communications Commission, "Communications Assistance for Law Enforcement Act,", FCC 98-282, released Nov. 5, 1998.*
Summary of CALEA Requirements, TIA TR45 Lawfully Authorized Electronic Surveillance, Version 2.1, Nov. 16, 2002.*

* cited by examiner

*Primary Examiner* — Robert Leung
(74) *Attorney, Agent, or Firm* — Swanson & Bratschun, L.L.C.

(57) ABSTRACT

Novel tools and techniques are provided for lawfully intercepting communications. In some embodiments, a lawful intercept application might be provided on a cloud computing system. The lawful intercept application might include an application programming interface ("API") to exchange data with a plurality of different communication building blocks of different types. Communication intercept data associated with a particular communication between a lawful intercept subject and other parties may be received with the lawful intercept application. The communication intercept data may then be provided from a delivery function of the lawful intercept application to a collection function. In some cases, the collection function might be part of the lawful intercept application, might be located at a government facility separate from the cloud computing system, or might be two collection functions, one of which is part of the lawful intercept application and the other of which is located at the government facility.

20 Claims, 7 Drawing Sheets

LAWFUL INTERCEPT UTILITY APPLICATION

CROSS-REFERENCES TO RELATED APPLICATIONS

This application claims priority to U.S. Patent Application Ser. No. 61/816,909 (the "'909 application"), filed Apr. 29, 2013 by Michael J. Fargano et al., entitled, "Lawful Intercept Utility Application," and U.S. Patent Application Ser. No. 61/857,750 (the "'750 application"), filed Jul. 24, 2013 by Michael J. Fargano et al., entitled, "Lawful Intercept Utility Application," the entire disclosure of each of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, apparatus, and computer software for facilitating lawful intercept of a subject's communications by law enforcement entities, and more particularly, to methods, systems, apparatus, and computer software for providing lawful intercept utility application in a cloud based environment.

BACKGROUND

The telecommunications industry and Law Enforcement Agencies ("LEAs" including, e.g., the FBI) have struggled over the years regarding Lawful Intercept ("LI"). The general struggle is based on the rapid change of Information and Communications Technologies ("ICT") and the slowness of LI laws and regulations (e.g., the Communications Assistance for Law Enforcement Act of 1994 ("CALEA")) to keep up. This manifests in several ways. For example, today in the U.S.A., an LEA has an option for a full broadband LI where the entire broadband content/streams/sessions of an LI subject can be provided to an LEA, yet the LEA may want only selected sessions. As an example, the LEA may be interested in the LI subject's e-mail, but not the video streaming of movies, and vice versa. Yet, the entire broadband LI is provided.

LEAs don't like this arrangement and have tried several approaches to ease the issue. For example, in the past, the FBI had requested a "buffering option" in standards where the Service Provider would buffer the broadband LI for later access by the LEA. Another option is where "summary information" can be provided as part of the broadband safe-harbor standard; although this is very useful, it does not work when all detailed communications are required for the LI. In addition, as we move in the cloud world where a multitude of applications in the cloud ("Apps") are available and personal communications can be embedded (e.g., VoIP or text embedded in a cloud based multi-player game and/or the like), the problem is that it would be more efficient for the LEA to have access to LI in the cloud on an App by App basis; not access to the entire broadband stream to a LI subject. Another issue is "black SUV rolls," like "truck rolls" for a service provider (which are costly). In this case, a Service Provider cannot provide the LI interface to the LEA for electronic handover of the LI information, thus the LEA might bring in equipment to the Service Provider's facility to perform the LI; this has inherent LEA expenses and inefficiencies to the process. In addition, there are numerous Apps that can provide for personal communications (such as user-to-user voice, text, or video), many of which are developed by small startups where LI capabilities are not even a consideration. Thus, more and more black SUV rolls will be needed to perform LI.

Hence, there is a need for more robust and scalable solutions for providing or facilitating lawful intercept for cloud computing based applications.

BRIEF SUMMARY

Various embodiments provide tools and techniques for implementing lawful intercept of a subject's data or communications, and for providing lawful intercept utility application, and in particular embodiments, providing lawful intercept utility application in a cloud-based environment.

In some instances, a Law Enforcement Agency ("LEA")-provided Lawful Intercept ("LI") application in the cloud (or "App") might be provided in a cloud environment with a well-described application programming interface ("API") to interface with a variety of Apps, where App developers and providers can easily interface with LEA for LI purposes.

The lawful intercept application, in some embodiments, might include an application programming interface ("API") to exchange data with a plurality of different communication building blocks of different types. Communication intercept data associated with a particular communication between a lawful intercept subject and other parties may be received with the lawful intercept application. The communication intercept data may then be provided from a delivery function of the lawful intercept application to a collection function. In some cases, the collection function might be part of the lawful intercept application, might be located at a government facility separate from the cloud computing system, or might be two separate collection functions, one of which is part of the lawful intercept application and the other of which is located at the government facility.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise providing, on a cloud computing system, a lawful intercept application comprising an application programming interface ("API") to exchange data with a plurality of different communication building blocks of different types. The method might further comprise receiving, through the API, communication intercept data with the lawful intercept application, and providing the communication intercept data from a delivery function of the lawful intercept application to a collection function.

In some embodiments, the lawful intercept application on the cloud computing system might comprise the collection function. In some cases, the collection function is located at a government facility separate from the cloud computing system. In some instances, the lawful intercept application might further comprise a collection front end function in communication with the collection function, and providing the communication intercept data to the collection function might comprise storing at least a portion of the communication intercept data at the collection front end function.

According to some aspects, the collection function might comprise a first collection function and a second collection function. The first collection function might be a part of the lawful intercept application on the cloud computing system and the second collection function might be located at a government facility separate from the cloud computing system. The lawful intercept application might further comprise a collection front end function in communication with each of the first collection function and the second collection function.

In some embodiments, providing the communication intercept data to the collection function might comprise determining, with the collection front end function, whether the lawful intercept application is operating under safe harbor provisions. Based on a determination that the lawful intercept application is operating under safe harbor provisions, providing the communication intercept data to the collection function might comprise storing, with the collection front end function, at least a portion of the communication intercept data at the second collection function. Based on a determination that the lawful intercept application is not operating under safe harbor provisions, providing the communication intercept data to the collection function might comprise storing, with the collection front end function, at least a portion of the communication intercept data at the first collection function.

In some instances, providing the communication intercept data to the collection function might comprise determining, with the collection front end function, whether the communication intercept data falls under safe harbor provisions. Based on a determination that the communication intercept data falls under safe harbor provisions, providing the communication intercept data to the collection function might comprise storing, with the collection front end function, at least a portion of the communication intercept data at the second collection function. Based on a determination that communication intercept data does not fall under safe harbor provisions, providing the communication intercept data to the collection function might comprise storing, with the collection front end function, at least a portion of the communication intercept data at the first collection function.

According to some embodiments, the plurality of communication building blocks might comprise a communication building block to support voice communication, a communication building block to support text communication, a communication building block to support video communication, a communication building block to support multimedia communication, a communication building block to support chat communication, a communication building block to support e-mail communication, a communication building block to support social web application communication, a communication building block to support broadband access, and/or a communication building block to support Network Functions Virtualization ("NFV"). In some instances, the plurality of communication building blocks might comprise a communication building block to support one or more of identification information of parties to a communication with which the communication intercept data is associated, location information of parties to the communication with which the communication intercept data is associated, meta-data information of the communication with which the communication intercept data is associated, or date and time information of the communication with which the communication intercept data is associated.

In some cases, the API might receive the communication intercept data from a voice over Internet Protocol ("VoIP") switch. In some instances, the API might receive the communication intercept data from a broadband probe or tap. In some embodiments, the API might provide an interface to a hardware probe for intercepting the communication data at one or more of a public switched telephone network ("PSTN") switch or a wireless switch.

In another aspect, a cloud computing system might comprise at least one processor and a non-transitory storage readable medium having stored thereon a set of instructions that, when executed by the at least one processor, causes the cloud computing system to perform one or more operations. The set of instructions might comprise instructions to provide, on the cloud computing system, a lawful intercept application comprising application programming interface ("API") to exchange data with a plurality of different communication building blocks of different types. The set of instructions might further comprise instructions to receive, through the API, communication intercept data with the lawful intercept application, and instructions to provide the communication intercept data from a delivery function of the lawful intercept application to a collection function.

In yet another aspect, an apparatus might comprise a non-transitory storage readable medium having stored thereon a set of instructions executable by a cloud computing system to perform one or more operations. The set of instructions might comprise instructions to provide, on the cloud computing system, a lawful intercept application comprising application programming interface ("API") to exchange data with a plurality of different communication building blocks of different types. The set of instructions might further comprise instructions to receive, through the API, communication intercept data with the lawful intercept application, and instructions to provide the communication intercept data from a delivery function of the lawful intercept application to a collection function.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
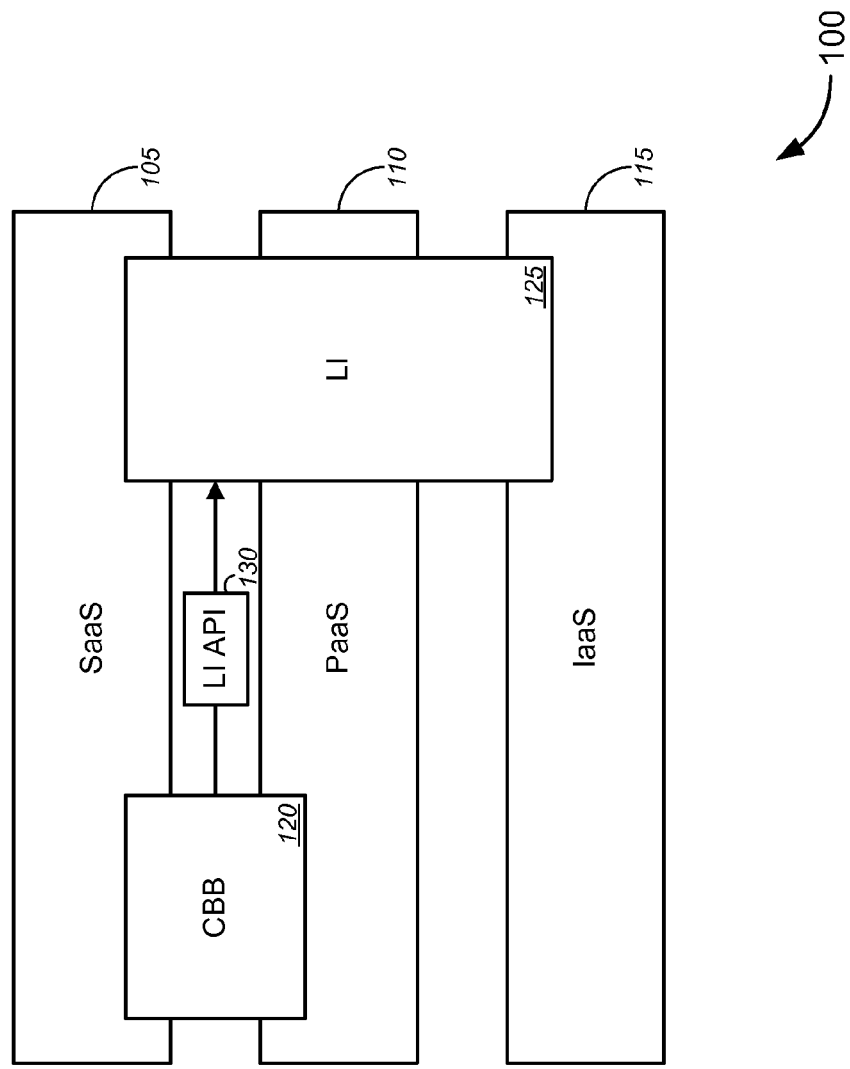
FIG. 1 is a general schematic diagram illustrating a system for implementing lawful intercept functionality, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide tools and techniques for providing lawful intercept utility application, and in particular embodiments, providing lawful intercept utility application in a cloud-based environment.

In some instances, a Law Enforcement Agency ("LEA")-provided Lawful Intercept ("LI") application in the cloud (or "App") might be provided in a cloud environment with a well-described application programming interface ("API") to interface with a variety of Apps, where App developers and providers can easily interface with LEA for LI purposes.

The lawful intercept application, in some embodiments, might include an application programming interface ("API") to exchange data with a plurality of different communication building blocks of different types. Communication intercept data associated with a particular communication between a lawful intercept subject and other parties may be received with the lawful intercept application. The communication intercept data may then be provided from a delivery function of the lawful intercept application to a collection function. In some cases, the collection function might be part of the lawful intercept application, might be located at a government facility separate from the cloud computing system, or might be two separate collection functions, one of which is part of the lawful intercept application and the other of which is located at the government facility. Based on a determination that either the lawful intercept application and/or particular communication intercept data falls under safe harbor provisions, the communication intercept data might be sent to and/or stored at the collection function located at the government facility. Based on a determination that either the lawful intercept application and/or particular communication intercept data does not fall under safe harbor provisions, the communication intercept data might be stored at the collection function that is part of the lawful intercept application.

In some embodiments, the LI App is provided in a cloud environment as a separate Utility App (not bundled with any specific service or service building blocks) with a well-described API to interface with a variety of Apps where App developers and providers can easily interface to LEA for LI purposes. This eliminates the black SUV roll and allows an LEA to perform the LI on an App by App basis; not rely on a broadband LI. The API can include options for LI segregation of voice, text, instant message ("IM"), video, meta-data, and full user view from App. In addition, the functions from the LEA/LI Collector Function and post processing can be included in the LI App (e.g., buffering, minimization, etc.)

In setting up LI capabilities, which are rarely used, less capital expense ("CAPEX") and less operating expense ("OPEX") may be required. There may also be a large amount of goodwill established with LEAs in that this solves many of their problems as described above. In some cases, third party developers may also be involved.

Herein, "lawful intercept" might refer to intercept of a subject's communications—including, without limitation, e-mail communications, landline telephone communications, cellular phone communications, text message communications (including short message service ("SMS") communications, multimedia messaging service ("MMS") communications, and/or the like), on-line chat communications, video communications, Internet content browsing and usage, multimedia streaming, meta-data associated with any of these communications, and/or the like—by an LEA, as provided by law. The term "truck rolls" might refer to a need by a service provider to dispatch a technician in a truck (or other vehicle) to install, move, and/or configure an item of equipment, wiring, and/or the like, or to otherwise response to a service call or network outage. Dispatching the technician tends to be expensive. Analogously, "black SUV rolls" might herein refer to a need by an LEA to dispatch an LEA agent in an SUV (or other vehicle) to install, move, and/or configure an item of equipment, wiring, and/or the like, or to otherwise implement LI functionalities, in order to lawfully intercept an LI subject's communications.

We now turn to the embodiments as illustrated by the drawings. FIGS. 1-7 illustrate some of the features of the method, system, and apparatus for providing lawful intercept utility application, and, in some cases, providing lawful intercept utility application in a cloud-based environment, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

FIG. 1 is a general schematic diagram illustrating a system 100 for implementing lawful intercept functionality, in accordance with various embodiments. FIGS. 2-5 are general schematic diagrams illustrating various systems 200-500 for implementing lawful intercept functionality, in accordance with various embodiments.

In FIG. 1, system 100 might comprise a Software-as-a-Service ("SaaS") model 105, a Platform-as-a-Service ("PaaS") model 110, and an Infrastructure-as-a-Service ("IaaS") model 115. As shown in FIG. 1, a Communications Building Block ("CBB") 120 can be offered as a SaaS model 105 or a PaaS model 110. Alternatively, CBB 120 can be part of a Network Functions Virtualization ("NFV") implementation. To provide Lawful Intercept ("LI") access to the communications or data handled by the CBB 120, Law Enforcement (or Law Enforcement Agencies) may provide an LI function 125 with which the CBB can communicate using a defined API (e.g., an LI API) 130. The LI function 125 may be implemented on the same cloud infrastructure as the CBB 120, and the cloud infrastructure may be offered as an IaaS model 115.

A CBB 120 can be considered a general-purpose communication function that can provide one or more communication services (using any of a variety of transports and/or applications). Examples can include an online chat function, a text messaging function, a voice function (e.g., packet voice), a video function, a multimedia function, and/or the like. In some cases, a CBB 120 can reside in a cloud computing environment (which might be the same environment in which one or more of the LI functions reside) and/or it can run on dedicated hardware.

Figure 2:
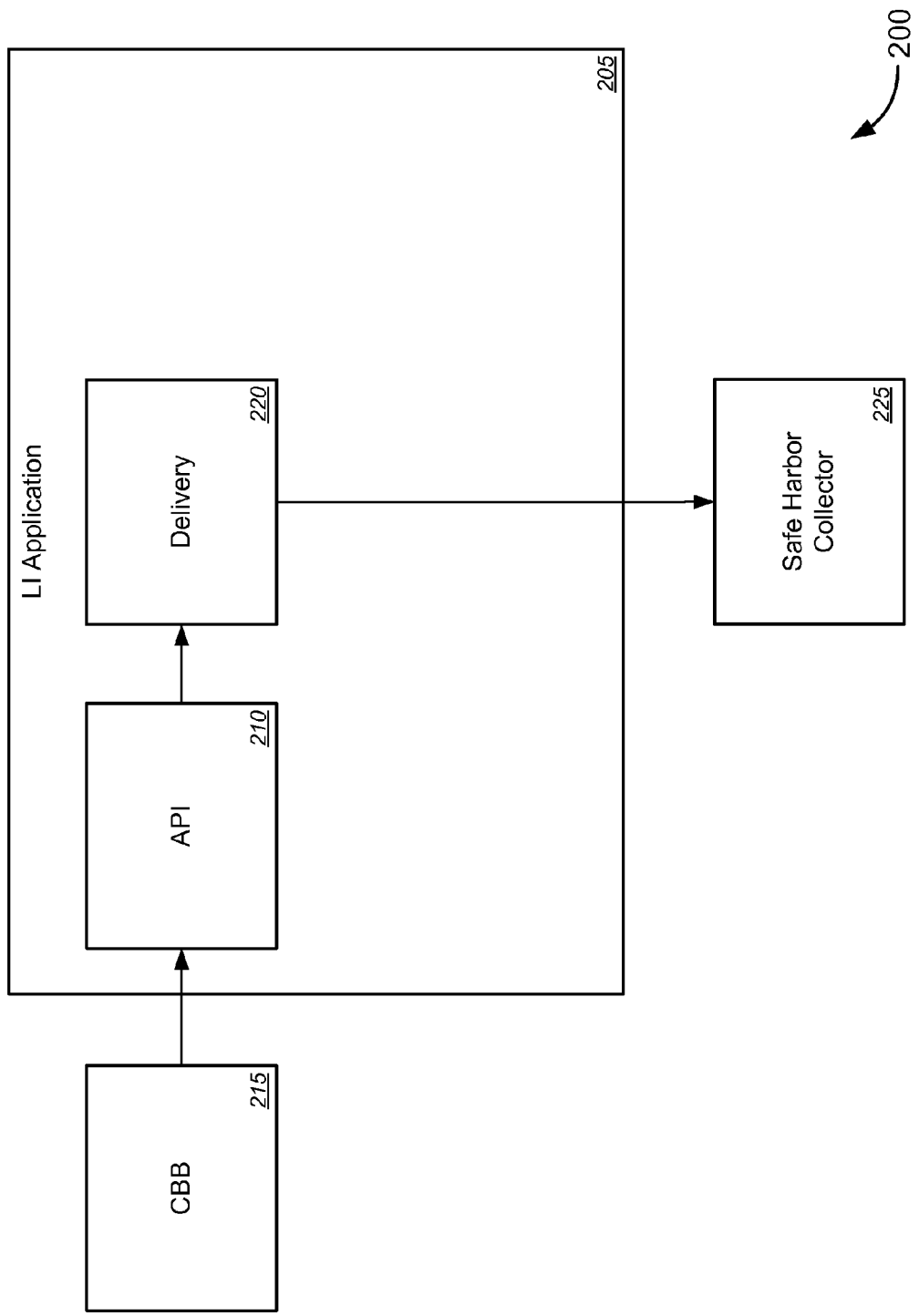
FIGS. 2-5 are general schematic diagrams illustrating various systems for implementing lawful intercept functionality, in accordance with various embodiments.

For example, FIG. 2 illustrates a LI system 200 that features a LI application 205 (which, as noted above, might be implemented as a software application in a cloud computing environment, as one or more hosted services, etc.). The application 205 can include an application-programming interface ("API") 210 that provides an interface to exchange data with different CBBs (e.g., CBB 215) of various types. Such CBBs 215 might be located in the same cloud environment as the LI application 205 or might be located/operated elsewhere, so long as they have communication with the API 210.

The API 210 can provide the ability for the application to receive communication intercept data from the CBB 215 (and other CBBs of various types) and therefore can provide a standard interface to receive intercept data from many different types of communication systems. Through the API 210, different forms of data from different communication systems can be received and processed by the application 205 in a standard manner. For example, the API 210 might provide a set of exposed methods that developers of CBBs can use to provide intercept data, which can include any of a variety of different types of data, including, but not limited to, content of communications, meta-data of communications, identification of parties to communications, location information about communications or parties thereto, date/time information about communications, and/or the like.

CALEA establishes a safe harbor for communication systems that adhere to certain established standards and/or employ approved techniques, and various embodiments can be employed in both a "safe-harbor environment" (i.e., communication system or environment that meets the requirements of the safe harbor) and a "non-safe-harbor environment" (i.e., a communication system or environment that does not meet such requirements). Thus, for example, the system 200 of FIG. 2 includes a delivery function 220 in communication with the API 210. In a safe harbor environment, the delivery function 220 can deliver the intercept data (in accordance with safe harbor requirements) to a collector function 225, which might be located, for example, at a government facility, such as FBI headquarters or other facility designated by the safe harbor function. The collector function 225 can be used to collect and process the intercept data as provided by law. In the system 200 of FIG. 2, the data might not be stored or otherwise managed within the application 205 (which, as noted above, might be hosted in a cloud environment, etc.), but instead might be delivered immediately outside the application 205 (and/or the cloud environment) to the collector function 225 at an authorized location.

Figure 3:
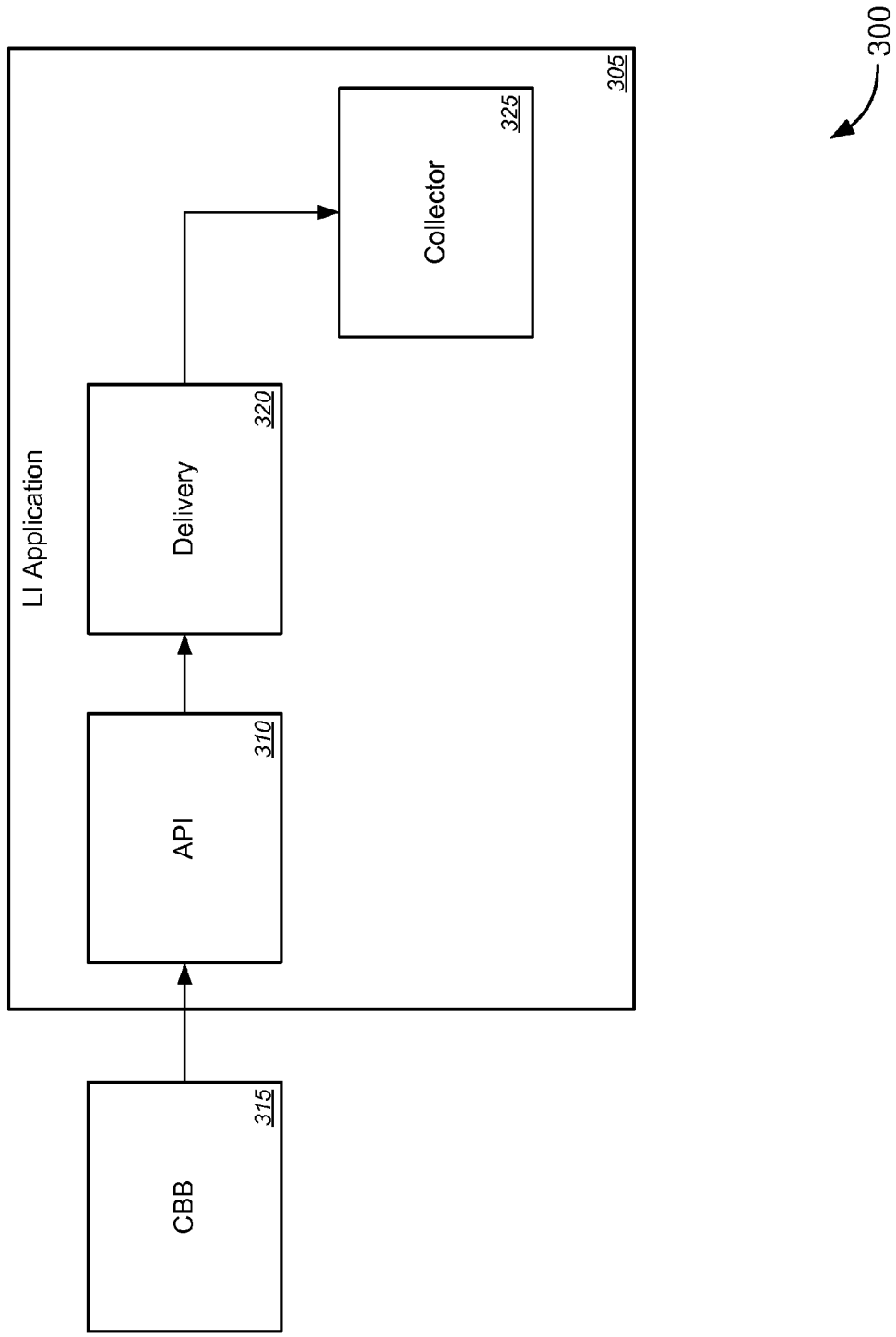

In other embodiments, outside the safe harbor provisions, some or all of the collector functionality might be included in the LI application itself. For example, FIG. 3 illustrates a similar system 300 comprising an application 305 that includes an API 310 to interface with a plurality of CBBs (e.g., CBB 315), as noted above. The system 300 also includes a delivery function 320 that delivers intercept data received by the API 310, but, in this embodiment, the delivery function 320 delivers the intercept data to a collection function 325 that is part of the application 305 and/or resides on the same system (e.g., a hosted environment) as the application 305.

Figure 4:
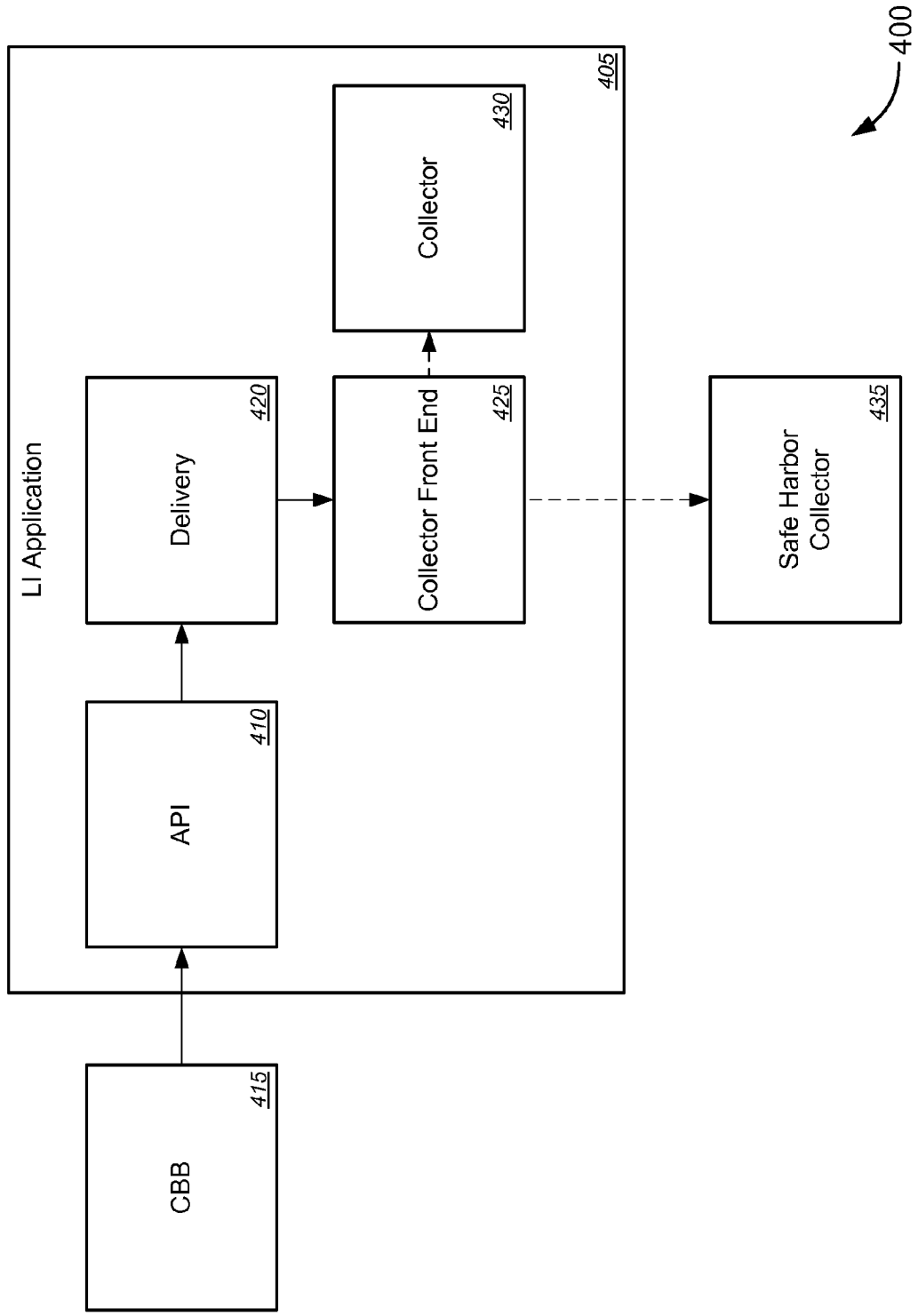

Further embodiments might be configured to function in either a safe harbor mode or a non-safe harbor mode (or both simultaneously). For example, FIG. 4 illustrates a system 400 that comprises a LI application 405 similar to those described above. For example, the application 405 might comprise an API 410 that receives intercept data from one or more CBBs 415 (e.g., as described above). In this set of embodiments, the application 405 comprises a delivery function 420 that delivers the intercept data to a collector front end function 425, which might be part of the application 405 and/or might reside on the same system as the application 405.

The collector front end 425 might have capability to store intercept data, or in some cases it might not. In other cases, the collector front end 425 might store some data and might not store other data. In an aspect, the collector front end 425 might be configurable to specify whether to store data and/or which data to store, according to whether the application 405 (or a particular intercept) operates under safe harbor provisions or not.

Similarly, the collector front end 425 can provide intercept data to a collector 430 that resides within the application 405 (or on the same system as the application 405), and/or the collector front end 425 can deliver data to a safe harbor collector 435, which, as noted above, might be located at an authorized facility, such as FBI headquarters. The system 400 of FIG. 4, therefore, can be customizable to allow flexible use cases—in some cases, the system might be configured so that the collector front end 425 stores no data but instead delivers data directly from the delivery function 420 to a safe harbor collector 435. In other cases, the collector front end 425 might store intercept data and/or deliver the data to a non-safe harbor collector 430. Such behavior can be configured for the application 405 generally and/or on a per-intercept basis, as appropriate, by configuration of appropriate functionality in the collector front end 425, without the need for modification of the API 410 or delivery function 420.

Figure 5:
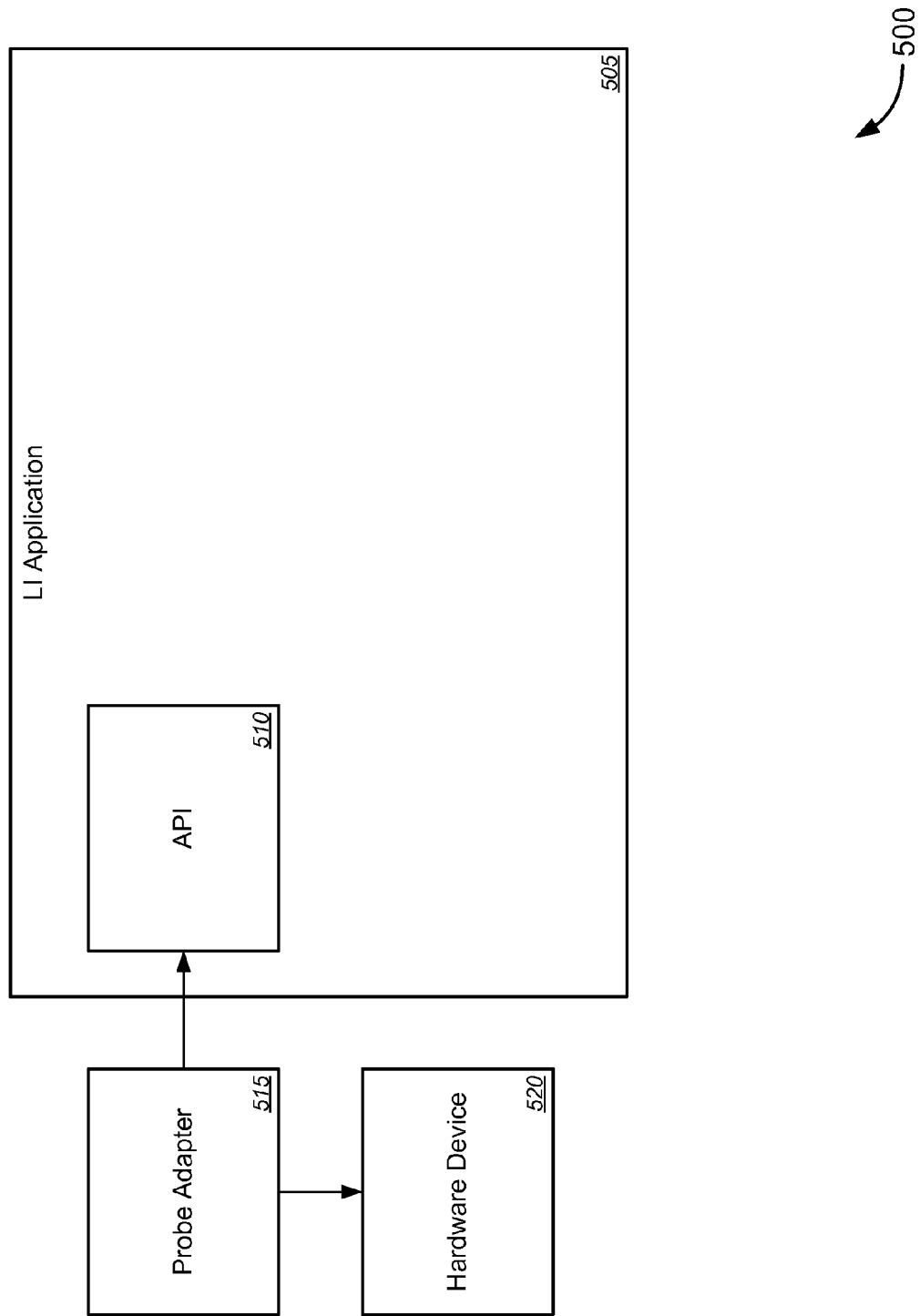

In some cases, the API can be configured to interface with communication technologies other than CBBs. For instance, FIG. 5 illustrates a system 500 in which an LI application 505 includes an API 510 (as well as other components, which can be similar to those described above with respect to FIGS. 2-4 but which are not illustrated on FIG. 5 for ease of description). The API 510 can include an interface for CBBs (as described above), but can also include an interface for a probe adapter 515, which can be configured to obtain intercept data from a variety of hardware devices 520 (including, without limitation, a tablet computer, a smart phone, a mobile phone, a portable gaming device, a music player, a video player, a laptop computer, a desktop computer, a set-top box, a television, a vehicle's on-board system computer(s), a server, a database, a non-database data storage device, and/or the like). Merely by way of example, in some cases, a probe adapter 515 might be designed to interface with a public switched telephone network ("PSTN") switch, such as a class 5 switch, etc., similar to a traditional intercept probe, except that the probe adapter 515 can further interface with the API 510. (For example, the probe adapter 515 might have hardware adapters necessary to interface with the switch, but also an Ethernet adapter for communication over a data network and software for communicating over the network with the API 510, which might be in an application 505 hosted remotely in the cloud, a data center, etc.) In other cases, the probe adapter 515 might be designed as a broadband probe or tap that can be used to intercept communications from a residential gateway, or as an interface to a traditional voice over Internet Protocol ("VoIP") switch. A variety of probe adapters 515 can be designed to provide a hardware interface between many different devices and an LI application 505.

Figure 6:
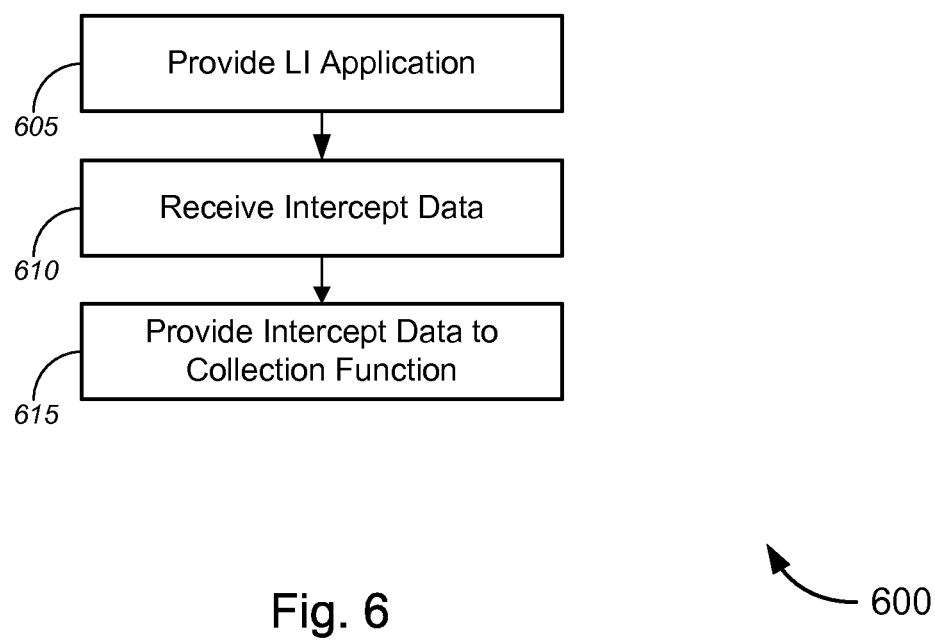
FIG. 6 is a flow diagram illustrating a method for implementing lawful intercept of a subject's data or communications, in accordance with various embodiments.

FIG. 6 illustrates a method 600 of lawfully intercepting communications or data, in accordance with various embodiments. The method 600 comprises providing a lawful intercept application (block 605). In a particular embodiment, providing a lawful intercept application can comprise hosting, operating, installing, etc. an application in a cloud environment. The method 600 can further comprise receiving (e.g., through an API) communication intercept data with the lawful intercept application (block 610). At block 615, the method 600 can comprise providing the communication intercept data from a delivery function of the lawful intercept application to a collection function (i.e., a collector), which, as noted above, could be located in the LI application, in a separate facility, such as a government facility, and/or the like.

Figure 7:
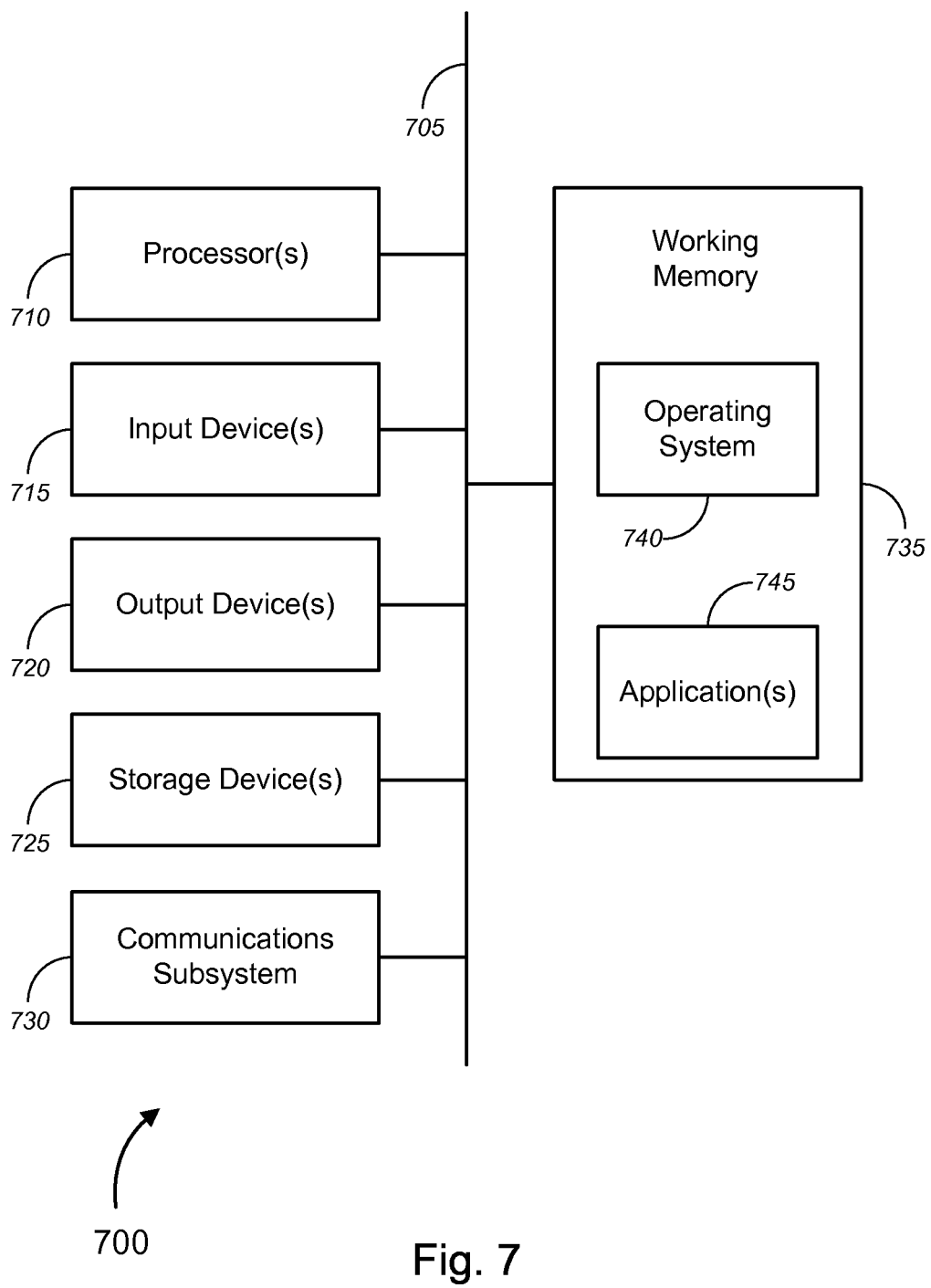
FIG. 7 is a block diagram illustrating an exemplary computer or system hardware architecture, in accordance with various embodiments.

FIG. 7 provides a schematic illustration of one embodiment of a computer system 700 that can perform the methods provided by various other embodiments, as described herein, and/or can function as a host for a lawful intercept application, as a probe adapter, and/or the like. In a particular aspect, any or all of the components of FIG. 7 can be virtualized and/or pooled resources (as in a cloud computing environment, for example). It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including, without limitation, one or more general-purpose processors and/or one or more special-purpose processors (such as digital signal processing chips, graphics acceleration processors, and/or the like); one or more input devices 715, which can include, without limitation, a mouse, a keyboard, and/or the like; and one or more output devices 720, which can include, without limitation, a display device, a printer, and/or the like.

The computer system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 700 might also include a communications subsystem 730, which can include, without limitation, a modem, a network card (wireless or wired), an infrared communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer systems, and/or with any other devices described herein. In many embodiments, the computer system 700 will further comprise a working memory 735, which can include a RAM or ROM device, as described above.

The computer system 700 also may comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 700, and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire, and fiber optics, including the wires that comprise the bus 705, as well as the various components of the communication subsystem 730 (and/or the media by which the communications subsystem 730 provides communication with other devices). Hence, transmission media can also take the form of waves (including, without limitation, radio, acoustic, and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, an EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

providing, on a cloud computing system, a lawful intercept application comprising an application programming interface ("API") to exchange data with a plurality of different communication building blocks of different types;

receiving, through the API, communication intercept data with the lawful intercept application; and providing the communication intercept data from a delivery function of the lawful intercept application to a collection function;

wherein the collection function comprises a first collection function and a second collection function, the first collection function being a part of the lawful intercept application on the cloud computing system and the second collection function being located at a government facility separate from the cloud computing system, wherein the lawful intercept application further comprises a collection front end function in communication with each of the first collection function and the second collection function;

wherein providing the communication intercept data to the collection function comprises:

determining, with the collection front end function, whether the lawful intercept application is operating under safe harbor provisions;

based on a determination that the lawful intercept application is operating under safe harbor provisions, storing, with the collection front end function, at least a portion of the communication intercept data at the second collection function; and based on a determination that the lawful intercept application is not operating under safe harbor provisions, storing, with the collection front end function, at least a portion of the communication intercept data at the first collection function.

2. The method of claim 1, wherein the lawful intercept application on the cloud computing system comprises the collection function.

3. The method of claim 1, wherein the collection function is located at a government facility separate from the cloud computing system.

4. The method of claim 3, wherein the lawful intercept application further comprises a collection front end function in communication with the collection function, and wherein providing the communication intercept data to the collection function comprises storing at least a portion of the communication intercept data at the collection front end function.

5. The method of claim 1, wherein providing the communication intercept data to the collection function comprises:

determining, with the collection front end function, whether the communication intercept data falls under safe harbor provisions;

based on a determination that the communication intercept data falls under safe harbor provisions, storing, with the collection front end function, at least a portion of the communication intercept data at the second collection function; and based on a determination that communication intercept data does not fall under safe harbor provisions, storing, with the collection front end function, at least a portion of the communication intercept data at the first collection function.

6. The method of claim 1, wherein the plurality of communication building blocks comprises a communication building block to support voice communication.

7. The method of claim 1, wherein the plurality of communication building blocks comprises a communication building block to support text communication.

8. The method of claim 1, wherein the plurality of communication building blocks comprises a communication building block to support video communication.

9. The method of claim 1, wherein the plurality of communication building blocks comprises a communication building block to support multimedia communication.

10. The method of claim 1, wherein the plurality of communication building blocks comprises a communication building block to support chat communication.

11. The method of claim 1, wherein the plurality of communication building blocks comprises a communication building block to support e-mail communication.

12. The method of claim 1, wherein the plurality of communication building blocks comprises a communication building block to support social web application communication.

13. The method of claim 1, wherein the plurality of communication building blocks comprises a communication building block to support broadband access.

14. The method of claim 1, wherein the plurality of communication building blocks comprises a communication building block to support Network Functions Virtualization ("NFV").

15. The method of claim 1, wherein the plurality of communication building blocks comprises a communication building block to support one or more of identification information of parties to a communication with which the communication intercept data is associated, location information of parties to the communication with which the communication intercept data is associated, meta-data information of the communication with which the communication intercept data is associated, or date and time information of the communication with which the communication intercept data is associated.

16. The method of claim 1, wherein the API receives the communication intercept data from a voice over Internet Protocol ("VoIP") switch.

17. The method of claim 1, wherein the API receives the communication intercept data from a broadband probe.

18. The method of claim 1, wherein the API provides an interface to a hardware probe for intercepting the communication data at one or more of a public switched telephone network ("PSTN") switch or a wireless switch.

19. A cloud computing system comprising:

at least one processor; and a non-transitory storage readable medium having stored thereon a set of instructions that, when executed by the at least one processor, causes the cloud computing system to perform one or more operations, the set of instructions comprising:

instructions to provide, on the cloud computing system, a lawful intercept application comprising application programming interface ("API") to exchange data with a plurality of different communication building blocks of different types;

instructions to receive, through the API, communication intercept data with the lawful intercept application; and instructions to provide the communication intercept data from a delivery function of the lawful intercept application to a collection function;

wherein the collection function comprises a first collection function and a second collection function, the first collection function being a part of the lawful intercept application on the cloud computing system and the second collection function being located at a government facility separate from the cloud computing system, wherein the lawful intercept application further comprises a collection front end function in communication with each of the first collection function and the second collection function;

wherein the instructions to provide the communication intercept data to the collection function comprises:

instructions to determine, using the collection front end function, whether the lawful intercept application is operating under safe harbor provisions;

instructions to, based on a determination that the lawful intercept application is operating under safe harbor provisions, store, using the collection front end function, at least a portion of the communication intercept data at the second collection function; and instructions to, based on a determination that the lawful intercept application is not operating under safe harbor provisions, store, using the collection front end function, at least a portion of the communication intercept data at the first collection function.

20. An apparatus, comprising:
a non-transitory storage readable medium having stored thereon a set of instructions executable by a cloud computing system to perform one or more operations, the set of instructions comprising:
  instructions to provide, on the cloud computing system, a lawful intercept application comprising application programming interface ("API") to exchange data with a plurality of different communication building blocks of different types;
  instructions to receive, through the API, communication intercept data with the lawful intercept application; and
  instructions to provide the communication intercept data from a delivery function of the lawful intercept application to a collection function;
wherein the collection function comprises a first collection function and a second collection function, the first collection function being a part of the lawful intercept application on the cloud computing system and the second collection function being located at a government facility separate from the cloud computing system, wherein the lawful intercept application further comprises a collection front end function in communication with each of the first collection function and the second collection function;
wherein the instructions to provide the communication intercept data to the collection function comprises:
  instructions to determine, using the collection front end function, whether the lawful intercept application is operating under safe harbor provisions;
  instructions to, based on a determination that the lawful intercept application is operating under safe harbor provisions, store, using the collection front end function, at least a portion of the communication intercept data at the second collection function; and
  instructions to, based on a determination that the lawful intercept application is not operating under safe harbor provisions, store, using the collection front end function, at least a portion of the communication intercept data at the first collection function.

* * * * *